(12) United States Patent
Aldana et al.

(10) Patent No.: US 10,129,875 B2
(45) Date of Patent: Nov. 13, 2018

(54) METHODS AND SYSTEMS FOR A RANGING PROTOCOL

(71) Applicant: QUALCOMM Incorporated, San Diego, CA (US)

(72) Inventors: Carlos Horacio Aldana, Mountain View, CA (US); Santosh Vamaraju, San Jose, CA (US); Olaf Hirsch, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/186,295

(22) Filed: Jun. 17, 2016

(65) Prior Publication Data
US 2017/0230969 A1 Aug. 10, 2017

Related U.S. Application Data

(60) Provisional application No. 62/294,890, filed on Feb. 12, 2016, provisional application No. 62/292,172, filed on Feb. 5, 2016.

(51) Int. Cl.
| | |
|---|---|
| *H04J 3/00* | (2006.01) |
| *H04W 72/04* | (2009.01) |
| *H04W 24/10* | (2009.01) |
| *H04W 64/00* | (2009.01) |
| *H04W 4/70* | (2018.01) |
| *H04W 88/08* | (2009.01) |

(52) U.S. Cl.
CPC ......... *H04W 72/0446* (2013.01); *H04W 4/70* (2018.02); *H04W 24/10* (2013.01); *H04W 64/003* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2014/0073352 A1* | 3/2014 | Aldana | G01S 5/10 455/456.1 |
| 2014/0254511 A1* | 9/2014 | Aldana | H04W 56/003 370/329 |
| 2014/0335885 A1* | 11/2014 | Steiner | H04W 64/00 455/456.1 |

(Continued)

FOREIGN PATENT DOCUMENTS

WO WO-2015047234 A1 4/2015

OTHER PUBLICATIONS

International Search Report and Written Opinion—PCT/US2017/012658—ISA/EPO—dated Apr. 12, 2017.

*Primary Examiner* — Otis L Thompson, Jr.
(74) *Attorney, Agent, or Firm* — Berkeley Law & Technology Group, LLP

(57) ABSTRACT

Disclosed are processes, devices and systems for exchanging messages between devices in support of measuring ranges between devices. In one particular implementation, a first wireless transceiver device may transmit one or more fine timing measurement (FTM) messages to a second wireless transceiver device, and receive a message acknowledging receipt of at least one of the one or more FTM messages. The first wireless transceiver device may authenticate the received message as being transmitted from the second wireless transceiver device.

24 Claims, 10 Drawing Sheets

(56) References Cited

U.S. PATENT DOCUMENTS

| | | | |
|---|---|---|---|
| 2015/0222602 A1* | 8/2015 | Steiner | H04L 63/0428 |
| | | | 713/168 |
| 2015/0257028 A1* | 9/2015 | Chu | G01S 13/74 |
| | | | 370/252 |
| 2015/0257120 A1* | 9/2015 | Prechner | H04W 64/003 |
| | | | 455/456.1 |
| 2016/0192137 A1* | 6/2016 | Steiner | H04W 4/023 |
| | | | 455/456.2 |
| 2016/0226886 A1* | 8/2016 | Steiner | G01S 5/0063 |
| 2016/0242056 A1* | 8/2016 | Patil | H04W 24/08 |
| 2017/0064505 A1* | 3/2017 | Eyal | H04W 4/023 |
| 2017/0064575 A1* | 3/2017 | Eyal | H04L 67/18 |
| 2017/0180933 A1* | 6/2017 | Steiner | H04W 4/023 |

* cited by examiner

METHODS AND SYSTEMS FOR A RANGING PROTOCOL

CROSS-REFERENCE TO RELATED APPLICATIONS

This patent application claims the benefit of and priority to U.S. Provisional Patent Application No. 62/292,172, filed Feb. 5, 2016, entitled "METHODS AND SYSTEMS FOR A RANGING PROTOCOL," and to U.S. Provisional Patent Application No. 62/294,890, filed Feb. 12, 2016, entitled "METHODS AND SYSTEMS FOR A RANGING PROTOCOL," both of which are assigned to the assignee hereof and which are incorporated herein in their entirety by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at a fixed location may be measured based, at least in part, on a measurement of a round trip time (RTT) measured between transmission of a first message from a first device to a second device and receipt of a second message at the first device transmitted in response to the first message.

SUMMARY

Briefly, one particular implementation is directed to a method comprising, method, at a first wireless transceiver device, comprising: transmitting a first fine timing measurement (FTM) message addressed to a second wireless transceiver device; and conditionally authenticating a received message as being transmitted by the second wireless transceiver device and acknowledging receipt of the first FTM message.

Another particular implementation is directed to a first wireless station (STA), comprising: a wireless transceiver to transmit messages to and receive messages from a communication network; and a processor coupled to the wireless transceiver, the processor being configured to: initiate transmission of a first fine timing measurement (FTM) message through the wireless transceiver, the first FTM message being addressed to a second STA; and conditionally authenticate a message received at the wireless transceiver as being transmitted by the second STA and acknowledging receipt of the first FTM message.

Another particular implementation is directed to a first wireless transceiver device, comprising: means for transmitting a first fine timing measurement (FTM) message addressed to a second wireless transceiver device; and means for conditionally authenticating a received message as being transmitted by the second wireless transceiver device and acknowledging receipt of the first FTM message.

Another particular implementation is directed to a non-transitory storage medium comprising computer readable instructions stored thereon which are executable by a processor of a first wireless transceiver device to: initiate transmission of a first fine timing measurement (FTM) message, the first FTM message being addressed to a second wireless transceiver device; and conditionally authenticate a received message as being transmitted by the second wireless transceiver device and acknowledging receipt of the first FTM message.

Another particular implementation is directed to a method at a first wireless transceiver device comprising: transmitting a first acknowledgement message indicating receipt of a first fine timing measurement (FTM) message transmitted by a second wireless transceiver device; and receiving a second FTM message from the second wireless transceiver, the second FTM message comprising one or more parameters based, at least in part, on a time of an authenticated receipt of the first acknowledgement message at the second wireless transceiver device.

Another particular implementation is directed to a first wireless station (STA) comprising: a wireless transceiver to transmit messages to and received messages from a communication network; and a processor coupled to the wireless transceiver, the processor being configured to: initiate transmission of a first acknowledgement message through the wireless transceiver indicating receipt of a first fine timing measurement (FTM) message transmitted by a second STA and received at the wireless transceiver; and obtain a second FTM message received at the wireless transceiver from the second STA, the second FTM message comprising one or more parameters based, at least in part, on a time of an authenticated receipt of the first acknowledgement message at the second STA.

Another particular implementation is directed to a non-transitory storage medium comprising computer readable instructions stored thereon which are executable by a processor of a first wireless transceiver device to: initiate transmission of a first acknowledgement message indicating receipt, at the first wireless transceiver device, of a first fine timing measurement (FTM) message transmitted by a second wireless transceiver device; and obtain a second FTM message received at the first wireless transceiver device from the second wireless transceiver, the second FTM message comprising one or more parameters based, at least in part, on a time of an authenticated receipt of the first acknowledgement message at the second wireless transceiver device.

Another particular implementation is directed to a first wireless transceiver device comprising: means for transmitting a first acknowledgement message indicating receipt of a first fine timing measurement (FTM) message transmitted by a second wireless transceiver device; and means for receiving a second FTM message from the second wireless transceiver, the second FTM message comprising one or more parameters based, at least in part, on a time of an authenticated receipt of the first acknowledgement message at the second wireless transceiver device.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
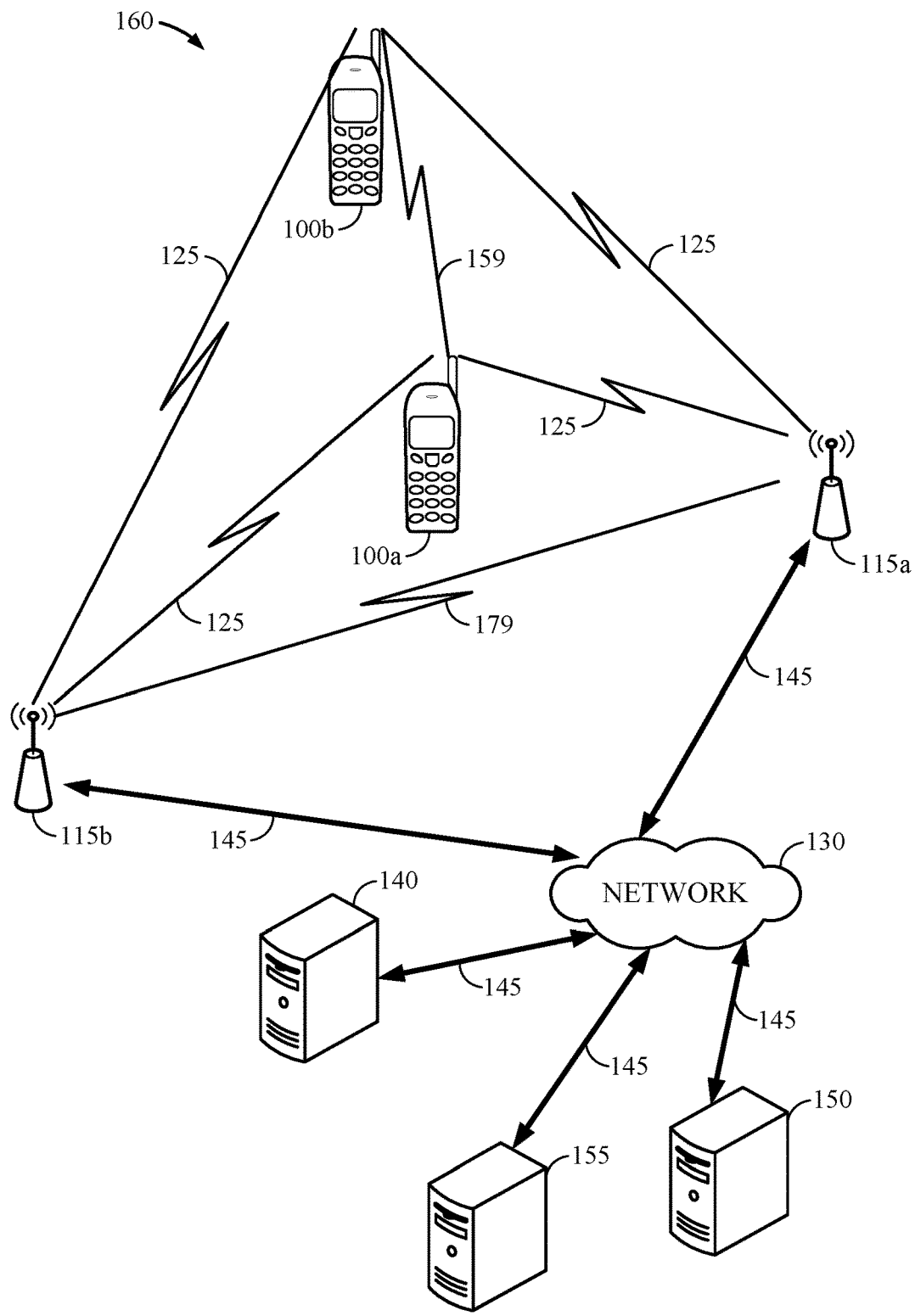
FIG. 1 is a system diagram illustrating certain features of a system containing a mobile device, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As discussed below, particular message flows may enable effective and efficient measurements of a range in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining round-trip time (RTT) or time of flight (TOF) measurements with sufficient accuracy for measuring a range between the wireless STAs using fewer messages, for example. Such a measured range may be used in any one of several applications including positioning operations, for example.

Transmissions of messages between STAs for the measurement of RTT typically occurs in addition to other message traffic supporting other applications such as voice, video, HTTP, data, just to provide a few examples. Accordingly, in dense operating environments, messaging between STAs for the measurement of RTT may increase congestion and contention for wireless link resources. In particular implementations discussed below, particular positioning techniques may be supported by measuring a TOF for the transmission of a message between STAs using fewer messages than typical techniques used for measuring RTT. According to an embodiment, TOF may be measured for individual messages in a "burst" of messages transmitted close in a sequence. Combining multiple TOF measurements from a burst of received messages may enable reduction in measurement errors, for example.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100a and 100b over wireless link 159), or between two stationary transceivers (e.g., between local transceiver 115a and local transceiver 115b over wireless link 179), just to provide a few examples. In particular implementations, various techniques described herein may incorporate some, but not necessarily all, aspects or features of IEEE P802.11-REVmc™/D6.0 Draft Standard 802.11 for Information technology—Telecommunications and information exchange between systems, Local and metropolitan area networks—Specific requirements Part 11: Wireless LAN Medium Access Control (MAC) and Physical Layer (PHY), January 2016, section 11.24.6 (hereinafter "IEEE std. 802.11"). Indeed, it should be understood that some features described herein are not shown, described or taught in the IEEE std. 802.11.

Figure 2:
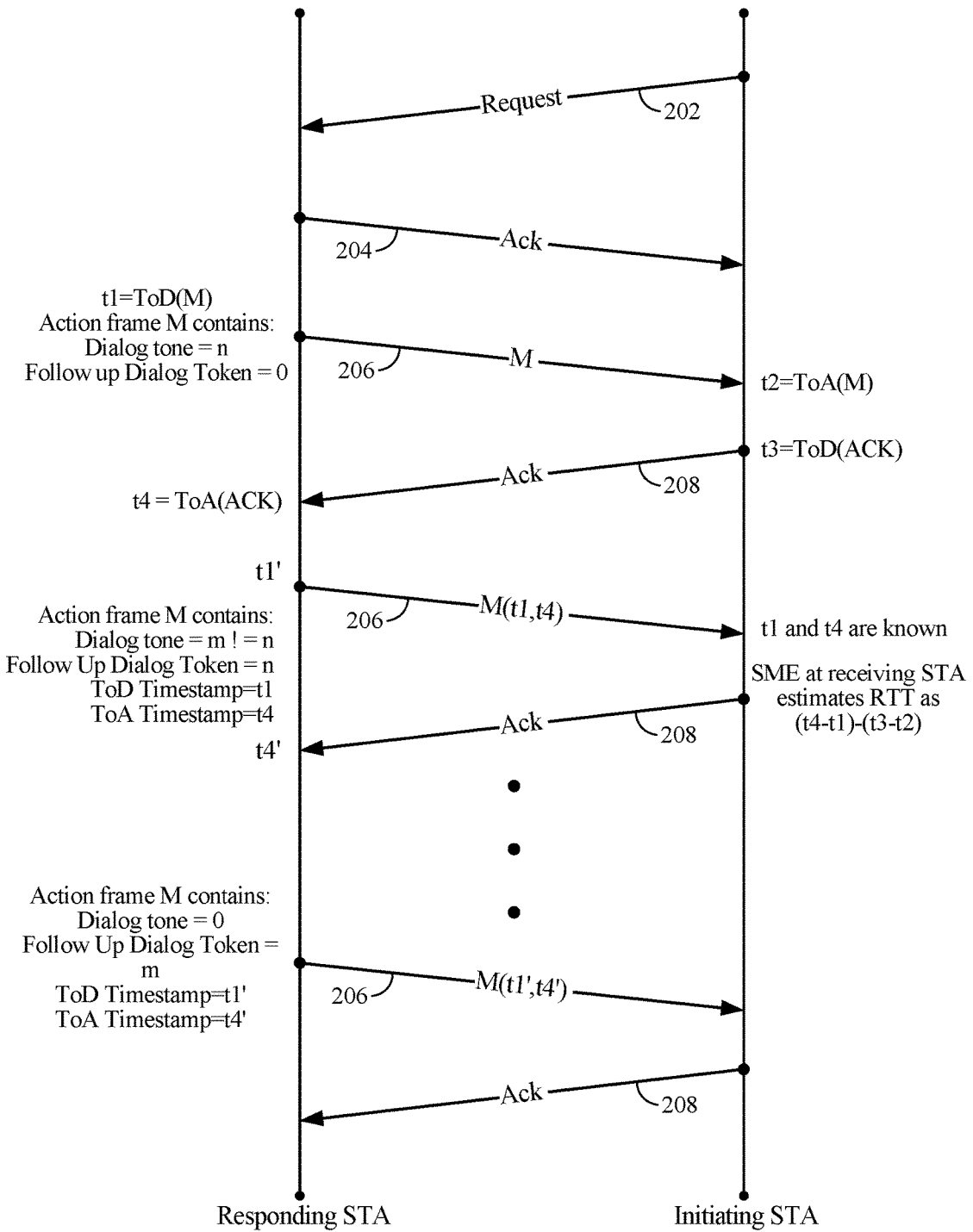
FIGS. 2 and 3 are message flow diagrams according to particular embodiments.

FIG. 2 is a diagram illustrating a message flow between wireless stations (STAs) including a "responding" STA and an "initiating" STA according to an embodiment. In this context, a STA, such as a responding STA or initiating STA, may comprise any one of several transceiver devices including a mobile device (e.g., mobile device 100) or stationary access transceiver device (e.g., local transceiver 115). Particular features of a STA may be shown in example implementations shown in FIGS. 9 and 10, for example. It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") 202 to the responding STA and receive a fine timing request message acknowledgement message or frame ("Ack") 204 transmitted in response. In a particular implementation, while not limiting claimed subject matter in this respect, contents of such a fine timing measurement request message 202 may be as shown in the IEEE std. 802.11. In particular implementations, such an Ack frame 204 may merely provide an indication of receipt of a previously transmitted message. The initiating STA may then obtain or compute an RTT measurement based, at least in part, on time stamp values (t1, t4) provided in fine timing measurement messages or frames ("M") 206 received from the responding STA (and transmitted in response to receipt of a fine timing measurement request message). In a particular implementation, as shown in the message flow diagram, a sequence of multiple exchanges of alternating fine timing measurement messages 206 followed by fine timing measurement acknowledgement messages 208 may create additional time stamp values (t1, t2, t3 and t4).

According to an embodiment, a fine timing measurement request (FTMR) message transmitted by an initiating STA may include fields, parameters, etc. characterizing a desired exchange of messages with a responding STA to provide fine timing measurements to the initiating STA enabling the initiating STA to compute an RTT measurement. In response to receipt of a FTM request message, a responding STA may transmit to the initiating STA one or more fine timing measurement (FTM) messages including measurements or parameters enabling the initiating STA to compute RTT or other parameters indicative of range.

In this context, an "FTM message" comprises a message transmitted from a transmitting device having one or more features that enables a device receiving the message to determine a time of receipt of the message. In a particular implementation, while not limiting claimed subject matter in this respect, contents of such a fine timing measurement message or frame may be as shown in the IEEE std. 802.11 at section. In one example implementation, an initiating STA may compute an RTT measurement as (t4−t1)−(t3−t2), where t2 and t3 are the time of receipt of a previous fine timing measurement message or frame and transmission of a preceding acknowledgement message or frame, respectively. The initiating STA may receive fine timing measurement frames in a burst to obtain a corresponding number of RTT measurements which may be combined for use of unbiased measurement noise in computing a range between the initiating and responding STAs.

According to an embodiment, a TOF of a message wirelessly transmitted from a transmitting device and acquired at a receiving device may be measured if the transmitted message includes a time stamp value indicating a transmission time. In a particular implementation, the transmitted message may comprise fields (e.g., preamble, header and payload) containing encoded symbols that are detectable at the receiving device. To acquire the transmitted message and determine a time of arrival, the receiving device may detect or decode a particular symbol or symbols in a sequence of symbols being transmitted by the message. If the particular symbol is referenced to the time stamp value also included in the transmitted message, the receiving device may measure TOF=RTT/2 based on a different between the time stamp value and an instance that the particular symbol is decoded or detected.

Figure 3:
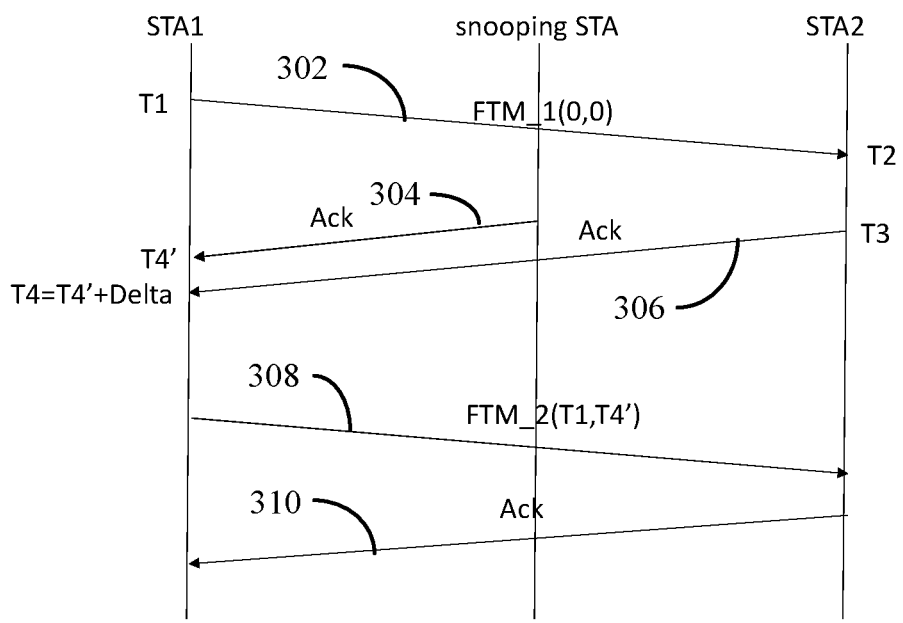

As discussed above in connection with FIG. 2, an initiating STA may compute an RTT measurement based, at least in part, on a time of arrival (t4) of an acknowledgment message transmitted by the initiating STA acknowledging receipt of an FTM message. In some scenarios, a rogue device (i.e., other than the initiating STA) may snoop FTM messages transmitted by a responding STA to the initiating STA, and transmit spoofed acknowledgement messages. This is illustrated by a non-limiting example shown in FIG. 3, a snooping STA may intercept an initial FTM message 302 intended for initiating STA STA2 and transmit a spoofed acknowledgment message 304 arriving at responding STA STA1 at time t4' (arriving earlier than a time t4 of an authentic acknowledgement message 306 transmitted from initiating STA STA2). Treating spoofed acknowledgement message 304 as an authentic acknowledgment message, STA1 may transmit a subsequent FTM message 308 having a time of arrival T4' of the spoofed acknowledgement message. STA2 may then compute an erroneous RTT based on time of arrival T4' of spoofed acknowledgement message 304. If the spoofing STA is closer to responding STA1 than is initiating STA STA2, for example, a time of arrival T4' may lead to a smaller value for RTT than if RTT is computed using a time of arrival T4 of authentic acknowledgement message 306.

Figure 4A:
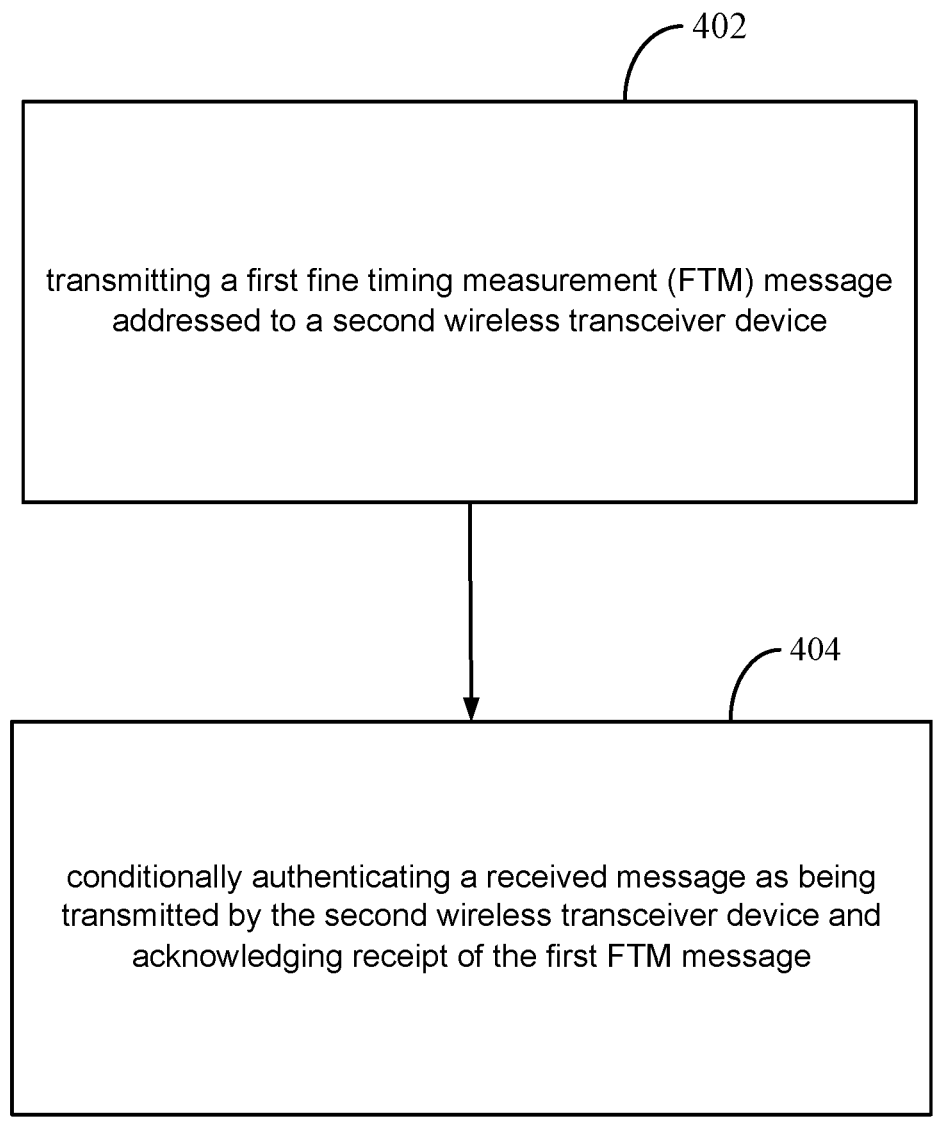
FIG. 4A is a flow diagram of a process to authenticate acknowledgement messages according to an embodiment.

In one particular implementation, a responding STA may authenticate messages received from an initiating STA acknowledging receipt of an FTM message based, at least in part, on one or more fields in the received message. FIG. 4A is a flow diagram of a process for determining whether an acknowledgement message received at a responding STA is authentic. At block 402, a first STA may transmit an FTM message which is addressed to a second STA. In a particular example, an FTM message transmitted at block 402 may comprise FTM message 302 transmitted from STA1 in response to receipt of an FTM request message (not shown) which is transmitted from ST2. Accordingly, in a particular embodiment, an FTM message transmitted at block 402 may be addressed to a STA that transmitted an FTM request message initiating the FTM message. In particular implementations, block 402 may be performed or enabled, at least in part, by wireless transceiver 1121 and antenna 1123 (FIG. 9) or communication interface 1830 and antenna 1808 (FIG. 10).

At block 404, a STA may conditionally authenticate a received message as being transmitted by a wireless transceiver device acknowledging receipt of the FTM message transmitted at block 402. For example, as pointed out above in FIG. 3, block 404 may attempt to determine whether message 304 or message 306 is an authentic acknowledgement message transmitted by STA2 in response to receipt of FTM message 302. In this context, "authentication" of a message as being transmitted by a particular wireless transceiver device is a process by which aspects or characteristics of the message are evaluated to infer whether the message was indeed transmitted by the particular wireless transceiver device. If such a message is not authenticated, for example, a recipient device may compute TOF or FTT using information other than a time of arrival of the unauthenticated message, for example, and/or may not transmit the arrival time of the message in a subsequent FTM message (e.g., FTM message 308). This may, for example, prevent transmission of an FTM message having an erroneous time of arrival T4 (e.g., prevents transmission of FTM message 308 having an erroneous T4' value). In particular implementations, block 404 may be performed or enabled, at least in part, by general purpose/application processor 1111 or DSP(s) 1112 in combination with instructions stored on memory 1140 (FIG. 9) or by processing unit 1820 in combination with instructions stored on memory 1822, for example.

Figure 4B:
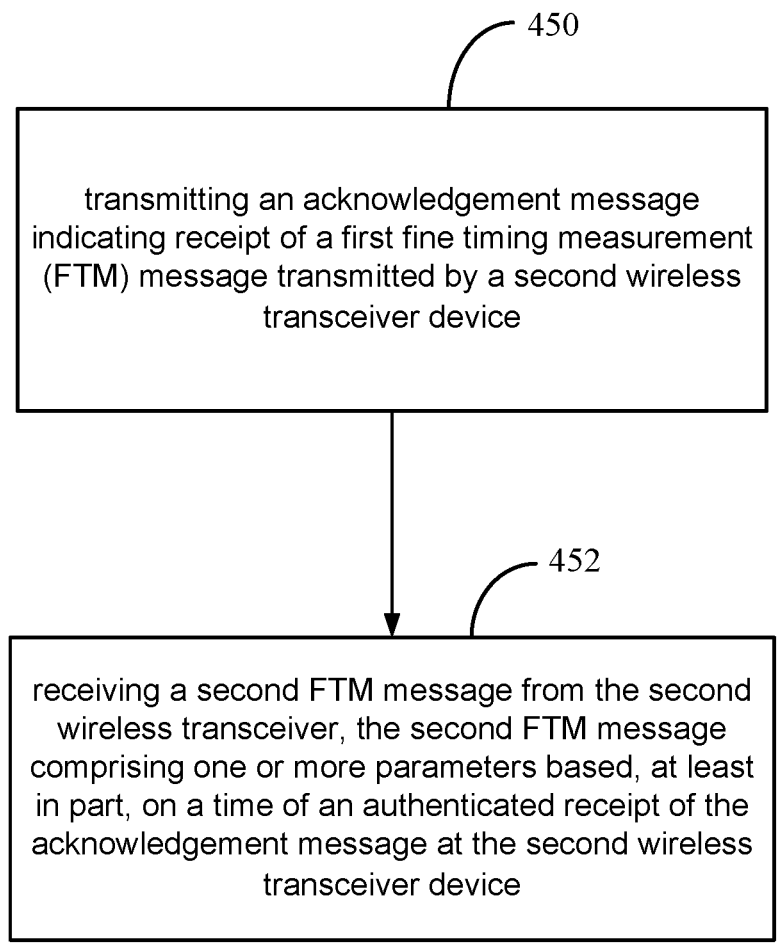
FIG. 4B is a flow diagram of a process to process fine timing measurement (FTM) messages according to an embodiment.

FIG. 4B is an example process performed by an initiating STA in communication with a responding STA processing acknowledgement messages according to FIG. 4A. Block 452 may transmit an acknowledgement message acknowledging receipt of a first FTM message transmitted by a responding STA. In an example, the acknowledgement message transmitted at block 452 may be received by a responding STA according to block 402. In particular implementations, block 452 may be performed or enabled, at least in part, by general purpose/application processor 1111 or DSP(s) 1112 in combination with instructions stored on memory 1140 (FIG. 9) or by processing unit 1820 in combination with instructions stored on memory 1822, for example.

Block 454 may involve receipt of a second FTM message transmitted from a responding STA. Here, the second FTM message may comprise one or more parameters based, at least in part, on a time of an authenticated receipt at the responding STA of the acknowledgement message transmitted at block 452. In this context, a "time of an authenticated receipt of an acknowledgement message" means a time of arrival of an acknowledgement message that has been authenticated as being transmitted from a particular source device. For example, "a time of an authenticated receipt of an acknowledgement message" may comprise a time of receipt of an acknowledgement message that has been authenticated according to block 404 as discussed herein, for example. In particular implementations, block 454 may be performed or enabled, at least in part, by general purpose/application processor 1111 or DSP(s) 1112 in combination with instructions stored on memory 1140 (FIG. 9) or by processing unit 1820 in combination with instructions stored on memory 1822, for example.

Figure 5:
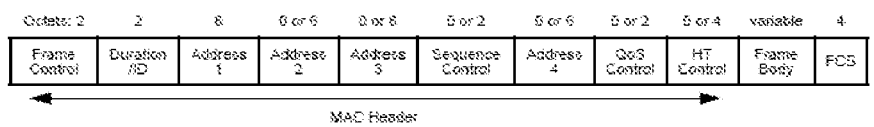
FIGS. 5 and 6 show fields of media access control (MAC) header of a message transmitted between wireless transceiver devices according to an embodiment.
Figure 6:
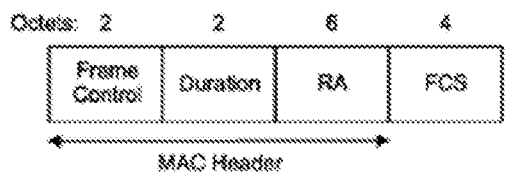

According to an embodiment, block 404 may conditionally authenticate an acknowledgement message based, at least in part, on contents of the message such as a media access control (MAC) address in a header of the acknowledgment message. For example, block 404 may compare a MAC address in a source field of a received message (e.g., message spoofed acknowledgement message 304 or acknowledgement message 306) with a source address in a field of a previous FTM message (e.g., FTM message 302), and authenticate the received message if there is a match. In one aspect, a header of an acknowledgement message may be modified to specify not only a destination address of an intended recipient device but also a MAC address of a device transmitting the acknowledgment message. As shown in FIG. 6, for example, the IEEE std. 802.11 specifies that a MAC header include an address for the acknowledgment message (e.g., a first tokenBSSID of an intended recipient responding STA) but does not specify that a MAC header include an address for a device transmitting the acknowledgment message. As shown in FIG. 5, according to an embodiment, additional fields may be included to specify addresses, wherein a field "Address 1" may specify a BSSID of a destination responding STA and a field "Address 2" may specify a BSSID of a source initiating STA. Here, a responding STA receiving an acknowledgement message with field "Address 2" may authenticate the acknowledgment message (e.g., acknowledgement message 306) if a source BSSID of a transmitting device in field "Address 2" matches a destination field of a header in an FTM message (e.g., FTM message 302) previously transmitted by the responding STA.

Figure 7:
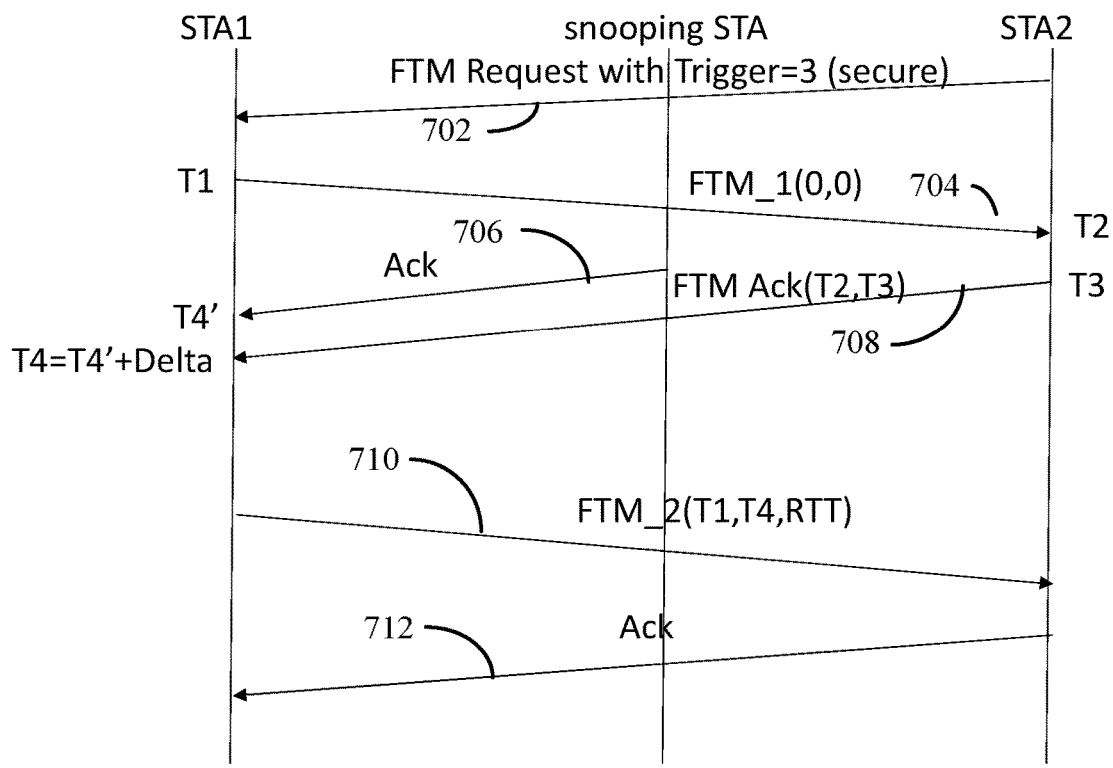
FIGS. 7 and 8 are message flow diagrams according to an embodiment.

In another embodiment, block 404 may conditionally authenticate an acknowledgement message by selecting an authentic acknowledgment messages from among multiple received messages. As shown in FIG. 7, responding STA STA1 may receive a spoofed acknowledgement message 706 at T4' and receive an authentic acknowledgment message 708 (transmitted from initiating STA STA1 in response to FTM message 704) at a time T4=T4'+Delta. Authentic acknowledgement message 708 may also include one or more fields indicating T2 (indicating a time stamp of an arrival for preceding FTM message 704) and T3 (indicating a time stamp of transmission of authentic acknowledgment message 708 (or, alternatively, a value for T2−T3). Recognizing that T2−T1≈T4−T3, a recipient responding STA STA1 may then compare a time of arrival of a received message (e.g., time of arrival of spoofed acknowledgement message 706 or time of arrival of authentic acknowledgement message 708) with T3+(T2−T1) to determine whether the acknowledgement message is authentic. If the time of arrival of the acknowledgement message does not deviate significantly from T3+(T2−T1) within an acceptable tolerance of error of the system, a responding STA STA1 may authenticate the received message. The responding STA STA1 may then provide the time of arrival of the authenticated received message in a subsequent FTM message 710 to initiating STA STA2. On the other hand, if the time of arrival of the received message deviates significantly from T3+(T2−T1), responding STA STA1 may not provide the time of arrival of the received message as T4 in subsequent FTM message 710 transmitted to initiating STA STA1. In an alternative implementation, initiating STA STA1 may compute RTT based on times T2 and T3 (and without using T4).

According to an embodiment, an initiating STA may optionally initiate the process of FIG. 4A in applications that are particularly vulnerable to erroneous time stamp values (e.g., T4') in FTM messages transmitted from a responding STA. In a particular embodiment, as shown in FIG. 7, an initial FTMR message 702 transmitted by initiating STA STA2 may include a parameter (e.g., a value of "3" in a "Trigger" field) specifying that messages acknowledging receipt of FTM messages are to be authenticated at a recipient responding STA according to one or more particular embodiments of the process of FIG. 4A. It should be understood, however, that use of a particular value in a Trigger field of an FTM request message is merely an example of how an initiating STA may indicate that acknowledgement messages are to be processed in a secure fashion, and claimed subject matter is not limited in this respect.

Figure 8:
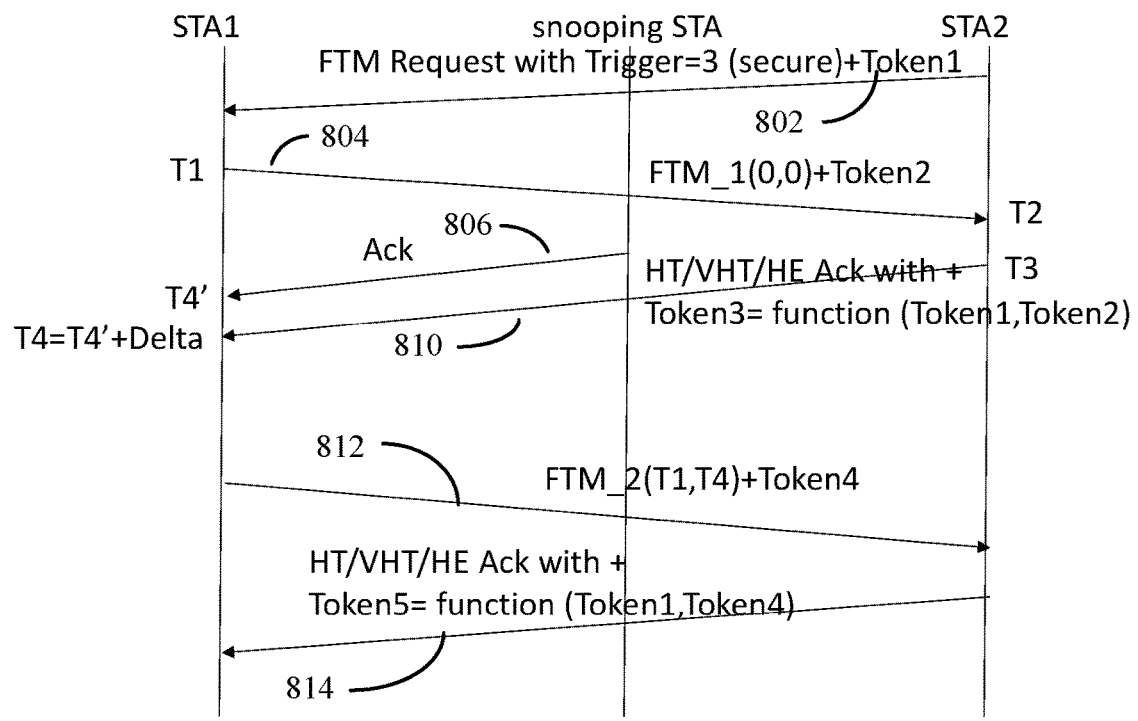

In an alternative embodiment shown in FIG. 8, a responding STA STA1 at block 404 may conditionally authenticate received messages as acknowledgement messages based, at least in part, on an exchange of tokens between responding STA STA1 and an initiating STA STA2, and a predetermined function. To enable increased accuracy in detection of time of arrival of acknowledgement messages at a responding STA, an initiating STA may transmit acknowledgement messages in a signal with increased frequency tones. In the particular implementation of FIG. 8, for example, initiating STA STA2 may increase frequency tones of acknowledgement messages by transmitting the acknowledgement messages in a particular signaling format such as a HT/VHT/HE format. Initiating STA STA1 may include in FTM request messages and acknowledgement messages tokens such as in the form of a bit pattern in a particular message field. For example, in an FTMR message 802, initiating STA STA2 may include a first token Token1. An initial FTM message 804 transmitted by responding STA STA1 in response to FTMR message 802 may include a second token Token2 (such as a second bit pattern in a particular field of FTM message 804). A subsequent acknowledgement message 810 from initiating STA STA2 acknowledging receipt of FTM message 804 may then include a Token3 computed as a particular function (e.g., a hash function) of Token1 and Token2. On receipt of acknowledgement message 810 acknowledging receipt of FTM message 804, responding STA STA1 may authenticate acknowledgement message 810 by computing the particular function of Token1 and Token2 to obtain a result, and comparing the result with Token3 obtained from received FTM message 810. Responding STA STA1 may choose to ignore an Ack frame that does not have the expected Token3 value.

According to an embodiment, a responding STA may individually authenticate messages as acknowledgements of multiple FTM messages transmitted in a burst of FTM messages requested by an FTM request message. In the example message flow of FIG. 8, FTM messages 804 and 812 may be transmitted in a burst of FTM messages requested by FTM request message 802. Following transmission of FTM message 812 containing a value of a time of receipt of authenticated acknowledgement message 810, responding STA STA1 of FIG. 8 may similarly authenticate a subsequent received message based on one or more different Tokens provided in the subsequent received message. For example, responding STA STA1 may replace Token2 in FTM message 804 with Token4 in FTM message 812. In response to receipt of FTM message 812, initiating STA STA2 may transmit acknowledgement message 814 containing Token5 as the result of computation of the particular function based on Token1 and Token4 (obtained from received FTM message 812). On receipt of acknowledgement message 814 acknowledging receipt of FTM message 812, responding STA STA1 may authenticate acknowledgement message 812 by computing the particular function of Token1 and Token4 to obtain a result, and comparing with Token5 obtained from received FTM message 814.

Figure 9:
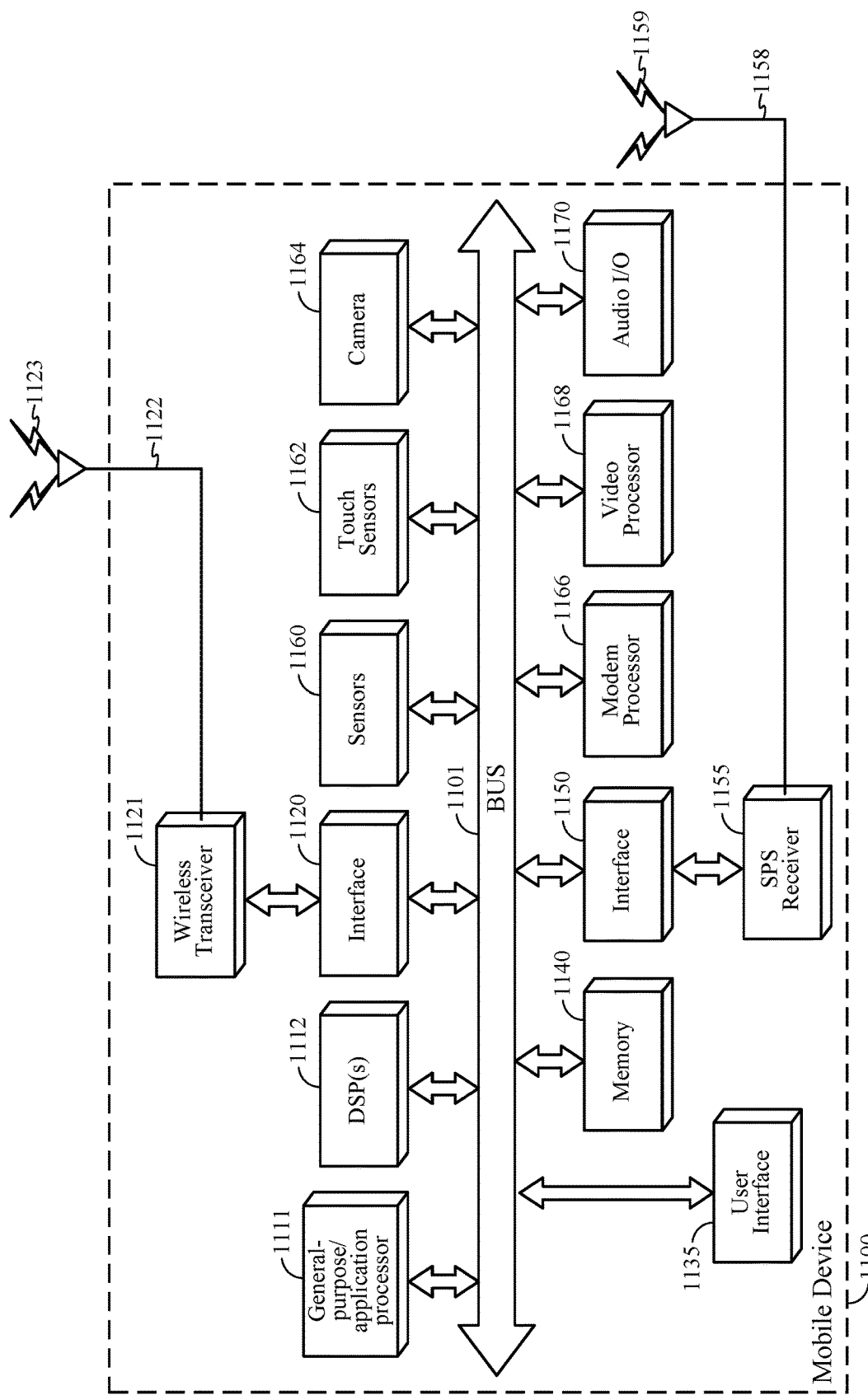
FIG. 9 is a schematic block diagram illustrating an exemplary device, in accordance with an implementation.
Figure 10:
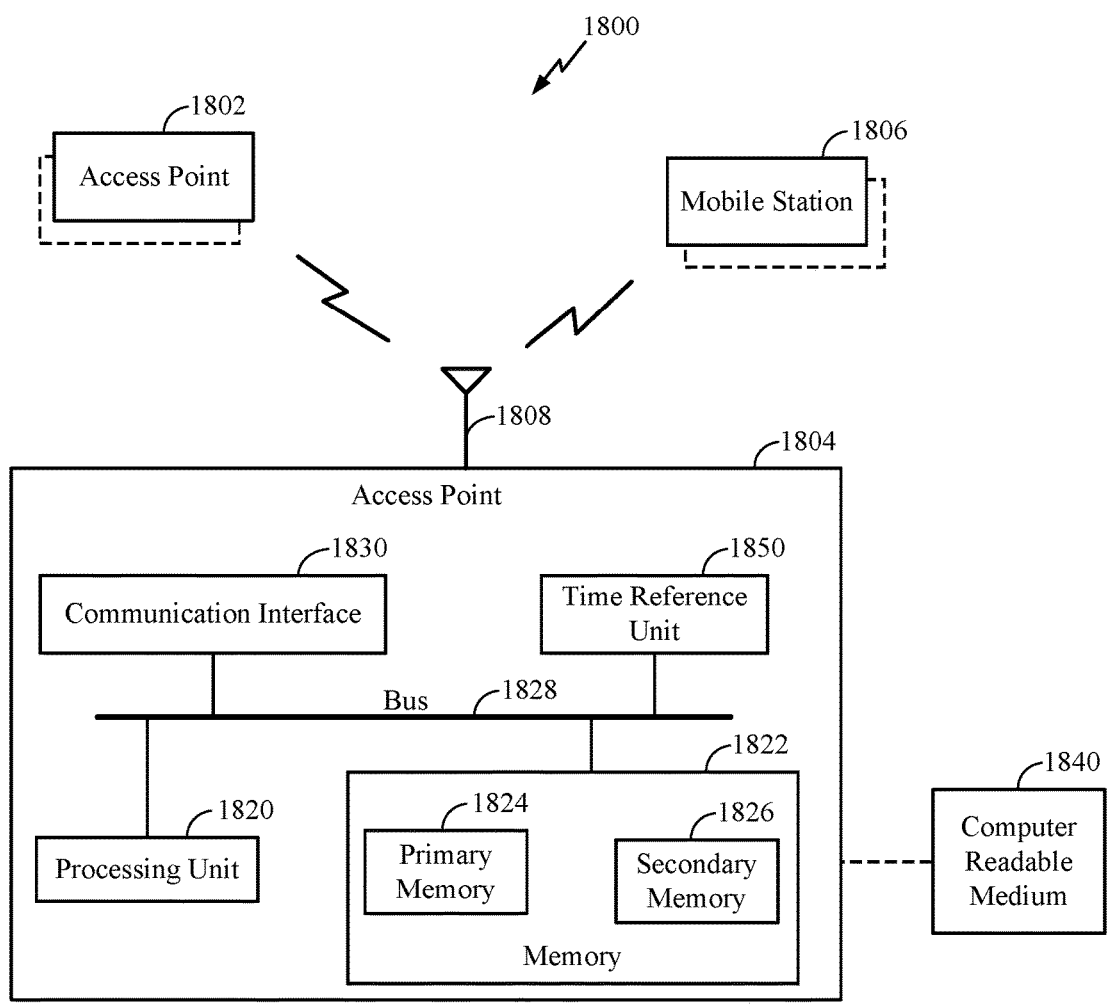
FIG. 10 is a schematic block diagram of an example computing system in accordance with an implementation.

FIG. 9 is a schematic diagram of a mobile device according to an embodiment. Mobile device 100 (FIG. 1) may comprise one or more features of mobile device 1100 shown in FIG. 8. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples. In an implementation, wireless transceiver 1121 may transmit or receive messages or frames (including components such as bits, bytes, values, parameters, fields, etc.) comprising signals in a physical transmission medium such as a physical transmission medium employed in a communication network.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1100. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 9, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 2 through 8.

Also shown in FIG. 9, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

FIG. 10 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 10, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 10, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 10, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 2 through 8.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver device, and the like. In other alternative implementations, communication interface 1830 may comprise a wired/LAN interface, wireless LAN interface (e.g., IEEE std. 802.11 wireless interface) and/or a wide area network (WAN) air interface. In an implementation, communication interface 1830 may transmit or receive messages or frames (including components such as bits, bytes, values, parameters, fields, etc.) comprising signals in a physical transmission medium such as a physical transmission medium employed in a communication network.

In a particular implementation, antenna 1808 in combination with communication interface 1830 may be used to implement transmission and reception of signals as illustrated in FIGS. 2 through 8.

In one particular implementation, transmission of an ACK message in response to a FTM measurement request message may be performed at communication interface 1830 without instruction or initiation from processing unit 1830.

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

In a particular embodiment a method at a first wireless transceiver device comprises: transmitting a first acknowledgement message indicating receipt of a first fine timing measurement (FTM) message transmitted by a second wireless transceiver device; and receiving a second FTM message from the second wireless transceiver, the second FTM message comprising one or more parameters based, at least in part, on a time of an authenticated receipt of the first acknowledgement message at the second wireless transceiver device. In a particular implementation, the method further comprises transmitting an FTM request message comprising one or more parameters requesting that the second wireless transceiver device authenticate messages acknowledging receipt of at least the first FTM message. For example, the one or more parameters requesting that the second wireless transceiver device authenticate messages acknowledging receipt of at least the first FTM message comprise one or more values in a Trigger field of the FTM request message. In another implementation, the first FTM message is transmitted by the second wireless transceiver device in response to receipt of an FTM request message comprising a first token, the FTM request message being transmitted from the first wireless transceiver device, wherein the first FTM message comprises a second token and the first acknowledgement message comprises a third token, and the method further comprises: receiving a second FTM message transmitted from the second wireless transceiver device, the second FTM message comprising one or more parameters based, at least in part, on a time of authenticated receipt of the second acknowledgement message at the second wireless transceiver device, the second acknowledgement message being authenticated at the second wireless transceiver device based, at least in part, on a comparison of the third token to a value computed at the second wireless transceiver device as a function of the first token and the second token. In another implementation, wherein the second FTM message comprises a fourth token, the method further comprising: transmitting a second acknowledgement message indicating receipt of the second FTM message transmitted by the second wireless transceiver device, the second acknowledgement message comprising a fifth token; and receiving a third FTM message transmitted from the second wireless transceiver device comprising one or more parameters based, at least in part, on a time of authenticated receipt of the second acknowledgement message at the second wireless transceiver device, the second acknowledgement message being authenticated at the second wireless transceiver device based, at least in part, on a comparison of the fifth token to a value computed as a function of the first token and the fourth token. In another particular implementation, the first acknowledgement message comprises one or more parameters indicating a time of arrival of the first FTM message at the first wireless transceiver device and a time that the first acknowledgement message is transmitted from the first wireless transceiver device, and wherein the first acknowledgement message is authenticated at the second wireless transceiver device as being transmitted by the first wireless transceiver device based, at least in part, on a comparison of a time of arrival of the first acknowledgement message with a value based, at least in part, on the one or more parameters indicating the time that the first FTM message is received at the second wireless transceiver device and the time that the first acknowledgement message is transmitted from the second wireless transceiver device.

In another embodiment, a first wireless station (STA) comprises: a wireless transceiver to transmit messages to and received messages from a communication network; and a processor coupled to the wireless transceiver, the processor being configured to: initiate transmission of a first acknowledgement message through the wireless transceiver indicating receipt of a first fine timing measurement (FTM) message transmitted by a second STA and received at the wireless transceiver; and obtain a second FTM message received at the wireless transceiver from the second STA, the second FTM message comprising one or more parameters based, at least in part, on a time of an authenticated receipt of the first acknowledgement message at the second STA. In a particular implementation, the one or more processors are further configured to initiate transmission of an FTM request message comprising one or more parameters requesting that the second STA authenticate messages acknowledging receipt of at least the first FTM message. In another particular implementation, the one or more parameters requesting that the second STA authenticate messages acknowledging receipt of at least the first FTM message comprise one or more values in a Trigger field of the FTM request message. In another particular implementation, the first FTM message is transmitted by the second STA in response to receipt of an FTM request message comprising a first token, the FTM request message being transmitted from the first STA, wherein the first FTM message comprises a second token and the first acknowledgement message comprises a third token, and wherein the processor is further configured to: obtain a second FTM message received at the wireless transceiver and transmitted from the second STA, the second FTM message comprising one or more parameters based, at least in part, on a time of authenticated receipt of the second acknowledgement message at the second STA, the second acknowledgement message being authenticated at the second STA based, at least in part, on a comparison of the third token to a value computed at the second STA as a function of the first token and the second token. In another particular implementation, the second FTM message comprises a fourth token, and wherein the processor is further configured to: initiate transmission of a second acknowledgement message through the wireless transceiver indicating receipt of the second FTM message transmitted by the second STA, the second acknowledgement message comprising a fifth token; and obtain a third FTM message received at the wireless transmitter and transmitted from the second STA comprising one or more parameters based, at least in part, on a time of authenticated receipt of the second acknowledgement message at the second STA, the second acknowledgement message being authenticated at the second STA based, at least in part, on a comparison of the fifth token to a value computed as a function of the first token and the fourth token. In another particular implementation, the first acknowledgement message comprises one or more parameters indicating a time of arrival of the first FTM message at the first STA and a time that the first acknowledgement message is transmitted from the first STA, and wherein the first acknowledgement message is authenticated at the second STA as being transmitted by the first STA based, at least in part, on a comparison of a time of arrival of the first acknowledgement message with a value based, at least in part, on the one or more parameters indicating the time that the first FTM message is received at the second STA and the time that the first acknowledgement message is transmitted from the second STA.

In another embodiment, a non-transitory storage medium comprises computer readable instructions stored thereon which are executable by a processor of a first wireless transceiver device to: initiate transmission of a first acknowledgement message indicating receipt, at the first wireless transceiver device, of a first fine timing measurement (FTM) message transmitted by a second wireless transceiver device; and obtain a second FTM message received at the first wireless transceiver device from the second wireless transceiver, the second FTM message comprising one or more parameters based, at least in part, on a time of an authenticated receipt of the first acknowledgement message at the second wireless transceiver device. In a particular implementation, the instructions are further executable by the processor to: initiate transmission of an FTM request message comprising one or more parameters requesting that the second wireless transceiver device authenticate messages acknowledging receipt of at least the first FTM message. In another particular implementation, the one or more parameters requesting that the second wireless transceiver device authenticate messages acknowledging receipt of at least the first FTM message comprise one or more values in a Trigger field of the FTM request message. In another particular implementation, the first FTM message is transmitted by the second wireless transceiver device in response to receipt of an FTM request message comprising a first token, the FTM request message being transmitted from the first wireless transceiver device, wherein the first FTM message comprises a second token and the first acknowledgement message comprises a third token, and wherein the instructions are further executable by the processor to: obtain a second FTM message received at the first wireless transceiver device and transmitted from the second wireless transceiver device, the second FTM message comprising one or more parameters based, at least in part, on a time of authenticated receipt of the second acknowledgement message at the second wireless transceiver device, the second acknowledgement message being authenticated at the second wireless transceiver device based, at least in part, on a comparison of the third token to a value computed at the second wireless transceiver device as a function of the first token and the second token. For example, the second FTM message may comprise a fourth token, and wherein the instructions are further executable by the processor to: initiate transmission of a second acknowledgement message indicating receipt of the second FTM message transmitted by the second wireless transceiver device, the second acknowledgement message comprising a fifth token; and obtain a third FTM message received at the first wireless transceiver device and transmitted from the second wireless transceiver device comprising one or more parameters based, at least in part, on a time of authenticated receipt of the second acknowledgement message at the second wireless transceiver device, the second acknowledgement message being authenticated at the second wireless transceiver device based, at least in part, on a comparison of the fifth token to a value computed as a function of the first token and the fourth token. In another particular implementation, the first acknowledgement message comprises one or more parameters indicating a time of arrival of the first FTM message at the first wireless transceiver device and a time that the first acknowledgement message is transmitted from the first wireless transceiver device, and wherein the first acknowledgement message is authenticated at the second wireless transceiver device as being transmitted by the first wireless transceiver device based, at least in part, on a comparison of a time of arrival of the first acknowledgement message with a value based, at least in part, on the one or more parameters indicating the time that the first FTM message is received at the second wireless transceiver device and the time that the first acknowledgement message is transmitted from the second wireless transceiver device.

In another embodiment, a first wireless transceiver device comprises: means for transmitting a first acknowledgement message indicating receipt of a first fine timing measurement (FTM) message transmitted by a second wireless transceiver device; and means for receiving a second FTM message from the second wireless transceiver, the second FTM message comprising one or more parameters based, at least in part, on a time of an authenticated receipt of the first acknowledgement message at the second wireless transceiver device. In one implementation, the first wireless transceiver device further comprises means for transmitting an FTM request message comprising one or more parameters requesting that the second wireless transceiver device authenticate messages acknowledging receipt of at least the first FTM message. In another implementation, the one or more parameters requesting that the second wireless transceiver device authenticate messages acknowledging receipt of at least the first FTM message comprise one or more values in a Trigger field of the FTM request message. In another particular implementation, the first FTM message is transmitted by the second wireless transceiver device in response to receipt of an FTM request message comprising a first token, the FTM request message being transmitted from the first wireless transceiver device, wherein the first FTM message comprises a second token and the first acknowledgement message comprises a third token, and further comprising: means for receiving a second FTM message transmitted from the second wireless transceiver device, the second FTM message comprising one or more parameters based, at least in part, on a time of authenticated receipt of the second acknowledgement message at the second wireless transceiver device, the second acknowledgement message being authenticated at the second wireless transceiver device based, at least in part, on a comparison of the third token to a value computed at the second wireless transceiver device as a function of the first token and the second token. In another implementation, the second FTM message comprises a fourth token, the first wireless transceiver device further comprises: means for transmitting a second acknowledgement message indicating receipt of the second FTM message transmitted by the second wireless transceiver device, the second acknowledgement message comprising a fifth token; and means for receiving a third FTM message transmitted from the second wireless transceiver device comprising one or more parameters based, at least in part, on a time of authenticated receipt of the second acknowledgement message at the second wireless transceiver device, the second acknowledgement message being authenticated at the second wireless transceiver device based, at least in part, on a comparison of the fifth token to a value computed as a function of the first token and the fourth token. In a particular implementation, the first acknowledgement message comprises one or more parameters indicating a time of arrival of the first FTM message at the first wireless transceiver device and a time that the first acknowledgement message is transmitted from the first wireless transceiver device, and wherein the first acknowledgement message is authenticated at the second wireless transceiver device as being transmitted by the first wireless transceiver device based, at least in part, on a comparison of a time of arrival of the first acknowledgement message with a value based, at least in part, on the one or more parameters indicating the time that the first FTM message is received at the second wireless transceiver device and the time that the first acknowledgement message is transmitted from the second wireless transceiver device.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, bytes, values, elements, symbols, characters, terms, numbers, numerals, expressions, messages, fields, identifiers frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples. References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn. While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At a first wireless transceiver device, a method comprising:
    transmitting a first message addressed to a second wireless transceiver device;
    receiving a second message acknowledging receipt of the first message; and
    conditionally authenticating the second message as being transmitted by the second wireless transceiver device, wherein the second message comprises one or more parameters indicating a time that the first message is received at the second wireless transceiver device and a time that the second message is transmitted from the second wireless transceiver device, and wherein conditionally authenticating the second message as being transmitted by the second wireless transceiver device further comprises comparing a time of arrival of the second message with a value based, at least in part, on the one or more parameters indicating the time that the first message is received at the second wireless transceiver device and the time that the second message is transmitted from the second wireless transceiver device.

2. The method of claim 1, wherein the first message comprises a first fine timing measurement (FTM) message, and further comprising:
transmitting a second FTM message addressed to the second wireless transceiver device comprising one or more parameters indicating a time of arrival of the second message in response to authenticating the second message as being transmitted by the second wireless transceiver device.

3. The method of claim 1, wherein conditionally authenticating the second message as being transmitted by the second wireless transceiver device and acknowledging receipt of the first message further comprises authenticating the second message further based, at least in part, on one or more parameters in the received message indicating a source device.

4. The method of claim 3, wherein the one or more parameters are indicative of a BSSID of the second wireless transceiver device.

5. The method of claim 1, wherein the first message comprises a fine timing measurement (FTM) message transmitted in response to receipt of an FTM request message transmitted from the second wireless transceiver device, and wherein the FTM request message comprises a value in a "Trigger" field specifying authentication of messages acknowledging receipt of FTM messages.

6. At a first wireless transceiver device, a method comprising:
transmitting a first message addressed to a second wireless transceiver device;
receiving a second message acknowledging receipt of the first message;
conditionally authenticating the second message as being transmitted by the second wireless transceiver device, wherein the first message is transmitted in response to receipt of a request message from the second wireless transceiver device comprising a first token, wherein the first message comprises a second token and the second message comprises a third token, and wherein conditionally authenticating the second message as being transmitted by the second wireless transceiver comprises comparing the third token to a value computed as a function of the first token and the second token;
transmitting a third message addressed to the second wireless transceiver device, the third message comprising a fourth token;
receiving a fourth message comprising a fifth token and acknowledging receipt of the third message; and
conditionally authenticating the fourth message as being transmitted by the second wireless transceiver device message based, at least in part, on a comparison of the fifth token to a value computed as a function of the first token and the fourth token.

7. A first wireless station (STA), comprising:
a wireless transceiver to transmit messages to and receive messages from a communication network; and
a processor coupled to the wireless transceiver, the processor being configured to:
initiate transmission of a first message through the wireless transceiver, the first message being addressed to a second STA;
obtain a second message received at the wireless transceiver acknowledging receipt of the first message; and
conditionally authenticate the second message as being transmitted by the second STA,
wherein the message received at the wireless transceiver comprises one or more parameters indicating a time that the first message is received at the second STA and a time that the second message is transmitted from the second STA, and wherein the processor is further configured to conditionally authenticate the second message as being transmitted by the second STA based, at least in part, on a comparison a time of arrival of the second message at the wireless transceiver with a value based, at least in part, on the one or more parameters indicating the time that the first message is received at the second STA and the time that the second message is transmitted from the second STA.

8. The first STA of claim 7, wherein the processor is further configured to:
initiate transmission of a third message through the wireless transceiver addressed to the second STA comprising one or more parameters indicating a time of arrival of the second message at the wireless transceiver in response to authenticating the second message as being transmitted by the second STA.

9. The first STA of claim 7, wherein the processor is further configured to conditionally authenticate the second message as being transmitted by the second STA by authenticating the second message further based, at least in part, on one or more parameters in the message received at the wireless transceiver indicating a source device.

10. The first STA of claim 9, wherein the one or more parameters are indicative of a BSSID of the second STA.

11. The first STA of claim 7, wherein the first message comprises a fine timing measurement (FTM) message transmitted in response to receipt of an FTM request message transmitted from the second STA, and wherein the FTM request message comprises a value in a "Trigger" field specifying authentication of messages acknowledging receipt of FTM messages.

12. A first wireless station (STA), comprising:
a wireless transceiver to transmit messages to and receive messages from a communication network; and
a processor coupled to the wireless transceiver, the processor being configured to:
initiate transmission of a first message through the wireless transceiver, the first message being addressed to a second STA;
obtain a second message received at the wireless transceiver acknowledging receipt of the first message; and
conditionally authenticate the second message as being transmitted by the second STA, wherein the first message is transmitted in response to receipt of a request message from the second STA comprising a first token, the first message comprises a second token and the second message comprises a third token, and wherein the processor is further configured to conditionally authenticate the second message as being transmitted by the second STA based on a comparison of the third token to a value computed as a function of the first token and the second token;
initiate transmission of a third message addressed to the second STA, the third message comprising a fourth token;
obtain a fourth message received at the wireless transceiver comprising a fifth token and acknowledging receipt of the third message; and conditionally authenticate the fourth message as being transmitted by the second STA based, at least in part, on a comparison of the fifth token to a value computed as a function of the first token and the fourth token.

13. A first wireless transceiver device, comprising:
means for transmitting a first message addressed to a second wireless transceiver device;
means for receiving a second message acknowledging receipt of the first message; and
means for conditionally authenticating the second message as being transmitted by the second wireless transceiver device,
wherein the second message comprises one or more parameters indicating a time that the first message is received at the second wireless transceiver device and a time that the second message is transmitted from the second wireless transceiver device, and wherein the means for conditionally authenticating the second message as being transmitted by the second wireless transceiver device further comprises means for comparing a time of arrival of the second message with a value based, at least in part, on the one or more parameters indicating the time that the first message is received at the second wireless transceiver device and the time that the second message is transmitted from the second wireless transceiver device.

14. The first wireless transceiver device of claim 13, and further comprising:
means for transmitting a third message addressed to the second wireless transceiver device comprising one or more parameters indicating a time of arrival of the second message in response to authenticating the second message as being transmitted by the second wireless transceiver device.

15. The first wireless transceiver device of claim 13, wherein the means for conditionally authenticating the second message as being transmitted by the second wireless transceiver device comprises means for authenticating the second message further based, at least in part, on one or more parameters in the second message indicating a source device.

16. The first wireless transceiver device of claim 15, wherein the one or more parameters are indicative of a BSSID of the second wireless transceiver device.

17. A first wireless transceiver device, comprising:
means for transmitting a first message addressed to a second wireless transceiver device;
means for receiving a second message acknowledging receipt of the first message;
means for conditionally authenticating the second message as being transmitted by the second wireless transceiver device, wherein the first message is transmitted in response to receipt of a request message from the second wireless transceiver device comprising a first token, the first message comprises a second token and the second message comprises a third token, and wherein the means for conditionally authenticating the second message as being transmitted by the second wireless transceiver device further comprises means for comparing the third token to a value computed as a function of the first token and the second token;
means for transmitting a third message addressed to the second wireless transceiver device, the third message comprising a fourth token;
means for receiving a fourth message from the second wireless transceiver device comprising a fifth token and acknowledging receipt of the third message; and
means for conditionally authenticating receipt of the fourth message as being transmitted by the second wireless transceiver device based, at least in part, on a comparison of the fifth token to a value computed as a function of the first token and the fourth token.

18. The first wireless transceiver device of claim 13, wherein the first message comprises a fine timing measurement (FTM) message transmitted in response to receipt of an FTM request message transmitted from the second wireless transceiver device, and wherein the FTM request message comprises a value in a "Trigger" field specifying authentication of messages acknowledging receipt of FTM messages.

19. A non-transitory storage medium comprising computer readable instructions stored thereon which are executable by a processor of a first wireless transceiver device to:
initiate transmission of a first message, the first message being addressed to a second wireless transceiver device;
obtain a second message received at the first wireless transceiver device acknowledging receipt of the first message; and
conditionally authenticate the second message as being transmitted by the second wireless transceiver device,
wherein the second message comprises one or more parameters indicating a time that the first message is received at the second wireless transceiver device and a time that the second message is transmitted from the second wireless transceiver device, and wherein the instructions are further executable by the processor to conditionally authenticate the second message as being transmitted by the second wireless transceiver device based on a comparison of a time of arrival of the second message with a value based, at least in part, on the one or more parameters indicating the time that the first message is received at the second wireless transceiver device and the time that the second message is transmitted from the second wireless transceiver device.

20. The storage medium of claim 19, further comprising instructions executable by the processor to:
initiate transmission of a third message addressed to the second wireless transceiver device comprising one or more parameters indicating a time of arrival of the second message in response to authentication of the second message as being transmitted by the second wireless transceiver device.

21. The storage medium of claim 19, further comprising instructions executable by the processor to conditionally authenticate the second message as being transmitted by the second wireless transceiver device based on authentication of the second message further based, at least in part, on one or more parameters in the second message indicating a source device.

22. The storage medium of claim 21, wherein the one or more parameters are indicative of a BSSID of the second wireless transceiver device.

23. The storage medium of claim 19, wherein the first message comprises a fine timing measurement (FTM) message transmitted in response to receipt of an FTM request message transmitted from the second wireless transceiver device, and wherein the FTM request message comprises a value in a "Trigger" field specifying authentication of messages acknowledging receipt of messages.

24. A non-transitory storage medium comprising computer readable instructions stored thereon which are executable by a processor of a first wireless transceiver device to:

initiate transmission of a first message, the first message being addressed to a second wireless transceiver device;

obtain a second message received at the first wireless transceiver device acknowledging receipt of the first message;

conditionally authenticate the second message as being transmitted by the second wireless transceiver, wherein the first message is transmitted in response to receipt of a request message from the second wireless transceiver device comprising a first token, the first message comprises a second token and the second message comprises a third token, and wherein the instructions are further executable by the processor to conditionally authenticate the second message as being transmitted by the second wireless transceiver device based on a comparison of the third token to a value computed as a function of the first token and the second token;

initiate transmission of a third message addressed to the second STA, the second message comprising a fourth token;

obtain a fourth message received at the first wireless transceiver device comprising a fifth token and acknowledging receipt of the third message; and conditionally authenticate receipt of the fourth message as being transmitted by the second STA based, at least in part, on a comparison of the fifth token to a value computed as a function of the first token and the fourth token.

* * * * *